US012578474B2

(12) United States Patent
Park et al.

(10) Patent No.: US 12,578,474 B2
(45) Date of Patent: Mar. 17, 2026

(54) CAMERA APPARATUS WITH INTEGRATED HETEROGENEOUS VIDEO

(71) Applicant: SAMSUNG ELECTRO-MECHANICS CO., LTD., Suwon-si (KR)

(72) Inventors: Young Seo Park, Suwon-si (KR); Dae Seob Kim, Suwon-si (KR); In Taek Song, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 1072 days.

(21) Appl. No.: 17/669,570

(22) Filed: Feb. 11, 2022

(65) Prior Publication Data

US 2022/0308230 A1     Sep. 29, 2022

(30) Foreign Application Priority Data

Mar. 25, 2021     (KR) ........................ 10-2021-0038925

(51) Int. Cl.
| | |
|---|---|
| *H04N 5/374* | (2011.01) |
| *G01S 7/4861* | (2020.01) |
| *G01S 17/894* | (2020.01) |
| *H04N 23/20* | (2023.01) |
| *H04N 25/76* | (2023.01) |

(52) U.S. Cl.
CPC .......... *G01S 17/894* (2020.01); *G01S 7/4861* (2013.01); *H04N 23/20* (2023.01); *H04N 25/76* (2023.01)

(58) Field of Classification Search
CPC ...... G01S 17/894; G01S 7/4861; H04N 5/374
USPC .......................................................... 348/46
See application file for complete search history.

(56) References Cited

U.S. PATENT DOCUMENTS

| | | | |
|---|---|---|---|
| 6,587,183 | B1 | 7/2003 | Uomori et al. |
| 2010/0128129 | A1 | 5/2010 | Kim |
| 2017/0146657 | A1 | 5/2017 | Xu |

(Continued)

FOREIGN PATENT DOCUMENTS

| | | |
|---|---|---|
| CN | 108291969 A | 7/2018 |
| CN | 109564290 A | 4/2019 |
| CN | 109936690 A | 6/2019 |

(Continued)

OTHER PUBLICATIONS

Chinese Office Action Issued on Mar. 7, 2025, in Counterpart Chinese Patent Application No. 202210285928.3 (7 Pages in English, 17 Pages in Chinese).

(Continued)

*Primary Examiner* — Nguyen T Truong
(74) *Attorney, Agent, or Firm* — NSIP Law

(57)     ABSTRACT

A camera apparatus includes a two-dimensional (2D) light source to generate first light for 2D imaging and to irradiate the first light to an object; a three-dimensional (3D) light source to generate second light for 3D imaging and to irradiate the object; a camera sensor to perform a time division mode operation which is time-divided into a first time and a second time, to image the object on which the first light is irradiated to generate a first image signal at the first time, to image the object on which the second light is irradiated to generate a second image signal at the second time; and a controller to control synchronization of the 2D light source and the camera sensor and to control synchronization of the 3D light source and the camera sensor during the time division mode operation.

17 Claims, 7 Drawing Sheets

(56)            References Cited

U.S. PATENT DOCUMENTS

2018/0041718 A1      2/2018  Price et al.
2019/0191108 A1      6/2019  Bao

FOREIGN PATENT DOCUMENTS

CN            110312079  A    10/2019
KR      10-2001-0040232  A     5/2001
KR      10-2002-0069291  A     8/2002
KR      10-2010-0059361  A     6/2010
KR          10-1726776  B1     4/2017

OTHER PUBLICATIONS

Korean Office Action issued on Feb. 17, 2022, in counterpart Korean Patent Application No. 10-2021-0038925 (12 pages in English and 8 pages in Korean).

CAMERA APPARATUS WITH INTEGRATED HETEROGENEOUS VIDEO

CROSS-REFERENCE TO RELATED APPLICATION(S)

This application claims the benefit under 35 USC 119(a) of Korean Patent Application No. 10-2021-0038925 filed on Mar. 25, 2021 in the Korean Intellectual Property Office, the entire disclosure of which is incorporated herein by reference for all purposes.

BACKGROUND

1. Field

The following description relates to a camera apparatus with an integrated heterogenous video.

2. Description of Background

In general, an indoor camera for a vehicle uses an IR image as well as a color (e.g., RGB) image, in order to recognize an object indoors even in a dark, low-light environment. Accordingly, when illuminance is very low, a person or an object indoors may be accurately recognized by using an LED light source that emits infrared (IR) light, invisible to the human eye or a vertical cavity surface emitting laser (VCSEL) light source without illuminating light (visible light) even in the dark.

Meanwhile, in order to more accurately recognize a person or an object, a (three-dimensional) 3D camera may be used.

For example, a stereo camera, a structured light camera, and a time of flight (TOF) camera are 3D cameras that measure depth of pixels of each image sensor to form a 3D image.

In general, two or more cameras are required to simultaneously recognize a two-dimensional (2D) color image and a 3D image.

Meanwhile, recently, a camera of a vehicle is required to have performance of recognizing a person or an object indoors, is required to have a small size, and is also required to have performance capable of simultaneously obtaining a 2D image and a 3D image as much as possible.

For example, an RGB/IR image sensor may shoot two types of images including a 2D color image and an IR image. The RGB/IR image sensor includes four pixels, three of the four pixels are RGB pixels, and the remaining pixel is an IR pixel.

A camera having the RGB/IR image sensor may include a dual pass filter that simultaneously transmits light in an RGB band and an IR band. Therefore, the camera may shoot a bright RGB color image indoors, and may turn on an invisible IR light source to shoot an IR image dark indoors even without turning on the light, thereby recognizing people or objects even in a dark environment.

However, since two cameras are required to simultaneously recognize a 2D image and a 3D image, there is a problem in that it may be difficult to simultaneously image the 2D image and the 3D image using one camera.

For example, a stereo 3D camera includes two cameras. The TOF 3D camera requires a special TOF sensor capable of measuring the arrival time of reflected light. At present, because it is difficult for the TOF sensor to recognize all RGB color images, a separate camera that shoots the 2D image is required. In addition, a structured light 3D camera may obtain the 3D image by using an IR light source (VCSEL) having a special pattern.

However, if the IR light source having the special pattern is used, there is a disadvantage in that the 2D IR image does not have a normal appearance due to the pattern.

As described above, the existing camera has a problem in that it is impossible to shoot both the 2D image and the 3D image by using one camera.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

A camera apparatus with an integrated heterogenous video capable of imaging both two-dimensional (2D) and three-dimensional (3D) images by using one camera not only in a bright environment but also even in a dark environment.

In one general aspect, a camera apparatus with an integrated heterogenous video includes a two-dimensional (2D) light source configured to generate first light for 2D imaging and to irradiate the first light to an object; a three-dimensional (3D) light source to configured to generate second light for 3D imaging and to irradiate the object; a camera sensor configured to perform a time division mode operation which is time-divided into a first time and a second time, to image the object on which the first light is irradiated to generate a first image signal at the first time, to image the object on which the second light is irradiated to generate a second image signal at the second time; and a controller configured to control synchronization of the 2D light source and the camera sensor and to control synchronization of the 3D light source and the camera sensor during the time division mode operation.

The controller may be configured to control the 2D light source to operate at the first time to generate the first light.

The controller may be configured to control the 3D light source to operate at the second time to generate the second light.

The camera sensor may include: an optical filter configured to allow the first light or a third light, which is a visible light, and the second light to pass therethrough; and an image sensor configured to sense the first light or the third light and the second light incident through the optical filter and to generate the first image signal and the second image signal.

The optical filter may include: a first filter unit configured to allow the first light or the third light to pass therethrough; and a second filter unit configured to allow the second light to pass therethrough.

The camera sensor may include an infrared ray (IR) sensor for the time division mode operation, and the image sensor may include: a first pixel unit configured to sense the first light incident through the first filter unit of the optical filter; and a second pixel unit configured to sense the second light incident through the second filter unit of the optical filter.

The controller may be configured to disable the 2D light source and to enable the 3D light source in a frequency division mode operation.

The camera sensor may include an RGB/IR sensor for the frequency division mode operation, and the image sensor may include: a first pixel unit configured to sense the third light incident through the first filter unit of the optical filter; and a second pixel unit configured to sense the second light incident through the second filter unit of the optical filter.

In another general aspect, a camera apparatus with an integrated heterogenous video includes a 3D light source configured to generate second light different from a visible light for 3D imaging and to irradiate an object with the second light; a camera sensor configured to perform a frequency division mode operation, to image the object on which the visible light is irradiated to generate a first image signal, and to image the object on which the second light is irradiated to generate a second image signal; and a controller configured to control the camera sensor to generate the first image signal and the second image signal during the frequency division mode operation.

The camera apparatus may include a 2D light source configured to generate first light for 2D imaging and to irradiate the first light to the object, and the controller may be configured to disable the 2D light source during the frequency division mode operation.

The controller may be configured to enable the 3D light source and to generate the second light during the frequency division mode operation.

The camera sensor may include: an optical filter configured to allow visible light and the second light to pass therethrough; and an image sensor configured to sense the visible light and the second light incident through the optical filter and to generate the first image signal and the second image signal.

The optical filter may include: a first filter unit configured to allow the visible light to pass therethrough; and a second filter unit configured to allow the second light to pass therethrough.

The camera sensor may include an RGB/IR sensor for the frequency division mode operation, and the RGB/IR sensor may be configured to shoot the object on which the visible light is irradiated to generate a first image signal, and to shoot the object on which the second light is irradiated to generate a second image signal in the frequency division mode operation.

The camera sensor may include an RGB/IR sensor for the frequency division mode operation, and the image sensor may include: a first pixel unit configured to sense the visible light incident through the first filter unit of the optical filter; and a second pixel unit configured to sense the second light incident through the second filter unit of the optical filter.

The second filter unit may be configured to allow the second light which is IR of 940 nm to pass therethrough, and the first filter unit may be configured to allow the visible light having a wavelength shorter than a wavelength of the second light to pass therethrough.

In another general aspect, a camera apparatus includes: a two-dimensional (2D) light source configured to generate first light for 2D imaging and to irradiate the first light to an object; a three-dimensional (3D) light source configured to generate second light for 3D imaging and to irradiate the second light to the object; a camera sensor configured to selectively perform one of a time division mode operation, in which the first light is irradiated on the object to generate a first image signal at a first time and the second light is irradiated on the object to generate a second image signal at a second time, and a frequency division mode operation, in which visible light is irradiated on the object to generate the first image signal and the second light is irradiated on the object to generate the second image signal; and a controller configured to selectively enable and disable the 2D light source and the 3D light source based on whether the camera sensor performs the time division mode operation or the frequency division mode operation.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
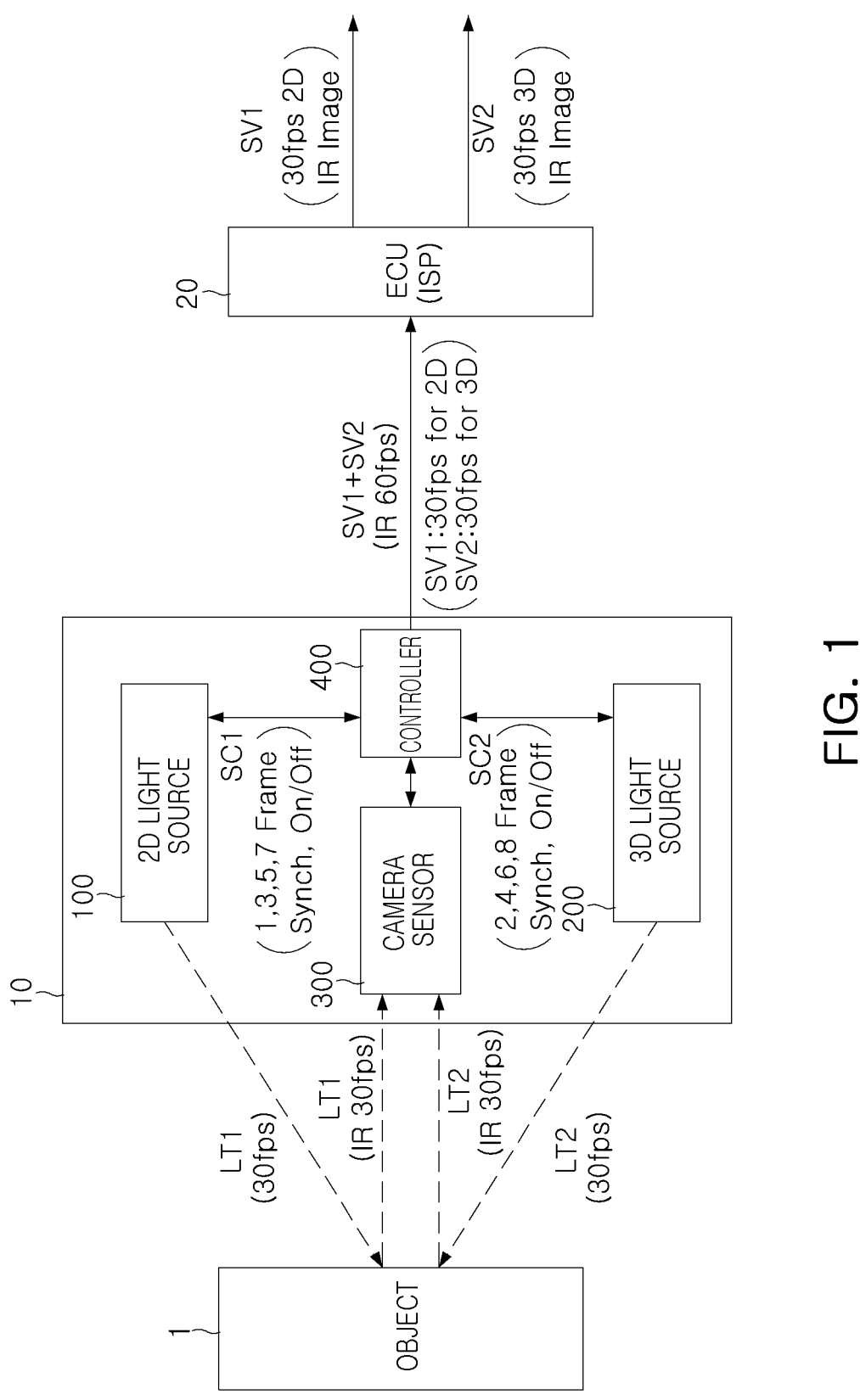
FIG. 1 is a schematic diagram of a camera apparatus according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

FIG. 1 is a schematic diagram of a camera apparatus according to an example.

Referring to FIG. 1, a camera apparatus 10 may include a 2D light source 100, a 3D light source 200, a camera sensor 300, and a controller 400.

The 2D light source 100 may generate first light LT1 for 2D imaging, in response to a control signal SC1 of the controller 400, and irradiate the first light LT1 to an object 1.

The 3D light source 200 may generate second light LT2 for 3D imaging, in response to a control signal SC2 of the controller 400, and irradiate the second light LT2 to the object 1.

For example, the 3D light source 200 may be an infrared vertical-cavity surface-emitting laser (IR VCSEL) that irradiates structured light, which is a specific pattern light, for 3D imaging.

For example, during indoor low-light imaging, a method of imaging a 2D image of one frame firstly and a 3D image of a next frame is repeated, and at this time, in order to shoot a 2D IR image during one frame, a general infrared light-emitting diode (IR LED) light source may be irradiated by using the 2D light source 100, and, a structure light (an IR light source having a pattern) may be irradiated in order to shoot a 3D image during the next frame.

The camera sensor 300 may determine one of a frequency division mode or a time division mode, in response to the control of the controller 400, perform the time-divided time division mode or the frequency division mode, shoot the object 1 on which the first light LT1 or the visible light is irradiated to generate a first image signal SV1, and shoot the object 1 on which the second light LT2 is irradiated to generate a second image signal SV2.

The controller 400 may perform the frequency division mode or the time division mode based on an operation mode signal input from the outside to control the 2D light source 100, the 3D light source 200, and the camera sensor 300, so as to be suitable for each mode. For example, the operation mode signal may be based on an illuminance signal or a user selection signal.

The controller 400 may, for example, control synchronization of the 2D light source 100 and the camera sensor 300 to operate at a determined first time, and control synchronization of the 3D light source 200 and the camera sensor 300 to operate at a determined second time during a time division mode operation.

The controller 400 may, for example, disable the 2D light source 100 and enable the 3D light source 200 during a frequency division mode operation.

For example, during the time division mode operation, the first light LT1 generated by the 2D light source 100 may be IR irradiated to correspond to 30 frames per second (fps), and the second light LT2 generated by the 3D light source 200 may be structured light IR irradiated to correspond to 30 fps.

In this case, the camera sensor 300 may include a first image signal SV1 having 30 fps for 2D and a second image signal SV2 having 30 fps for 3D to output an image signal SV1+SV2 having 60 fps.

For example, the camera sensor 300 may generate an image signal of 60 fps and may include a global shutter.

On the other hand, if it is sufficiently bright indoors and 2D image is sufficient with the RGB color image without IR, then imaging in the time division mode is not necessary. In general, the IR image uses a wavelength band of 850 nm or 940 nm, which may receive less interference from the RGB image using a wavelength band less than or equal to 700 nm. In this case, frequency division imaging is possible. In particular, a 2D RGB color image and a 3D IR image may be simultaneously shoot in every frame because a structure light of 940 nm (an IR light source having a pattern) has a smaller effect on the RGB color image.

For example, by using the same image sensor of 60 fps, a 2D image of 30 fps and a 3D image of 30 fps may be obtained in a dark environment, whereas a 2D image of 60 fps and a 3D image of 60 fps may be obtained in a bright environment. This is because the structured light is irradiated for all frames, the 2D color image is obtained through a visible light, which is a natural light, via RGB pixels, and the 3D image is obtained through a structured IR ray via IR pixels.

For example, in order to prevent the RGB image from being affected by the structured IR ray at all, the 2D image and the 3D image may be divided by 30 fps and shot through the aforementioned time division imaging.

Also, if 30 fps is not sufficient and 60 fps is needed because acquisition of high-speed 2D image and 3D image is simultaneously required even in low light, there is a method of correcting the 2D image. In this case, a general IR light source is not used and only the structure light IR light source is used for all frames. In this case, as for the 2D IR image, an image stained with an IR pattern may be obtained, and a general 2D image may be restored and used through image processing with the stained image.

With respect to each drawing of discussed herein, unnecessary redundant descriptions of components having the same reference numerals and the same functions may be omitted, and possible differences may be described with respect to each drawing.

Figure 2:
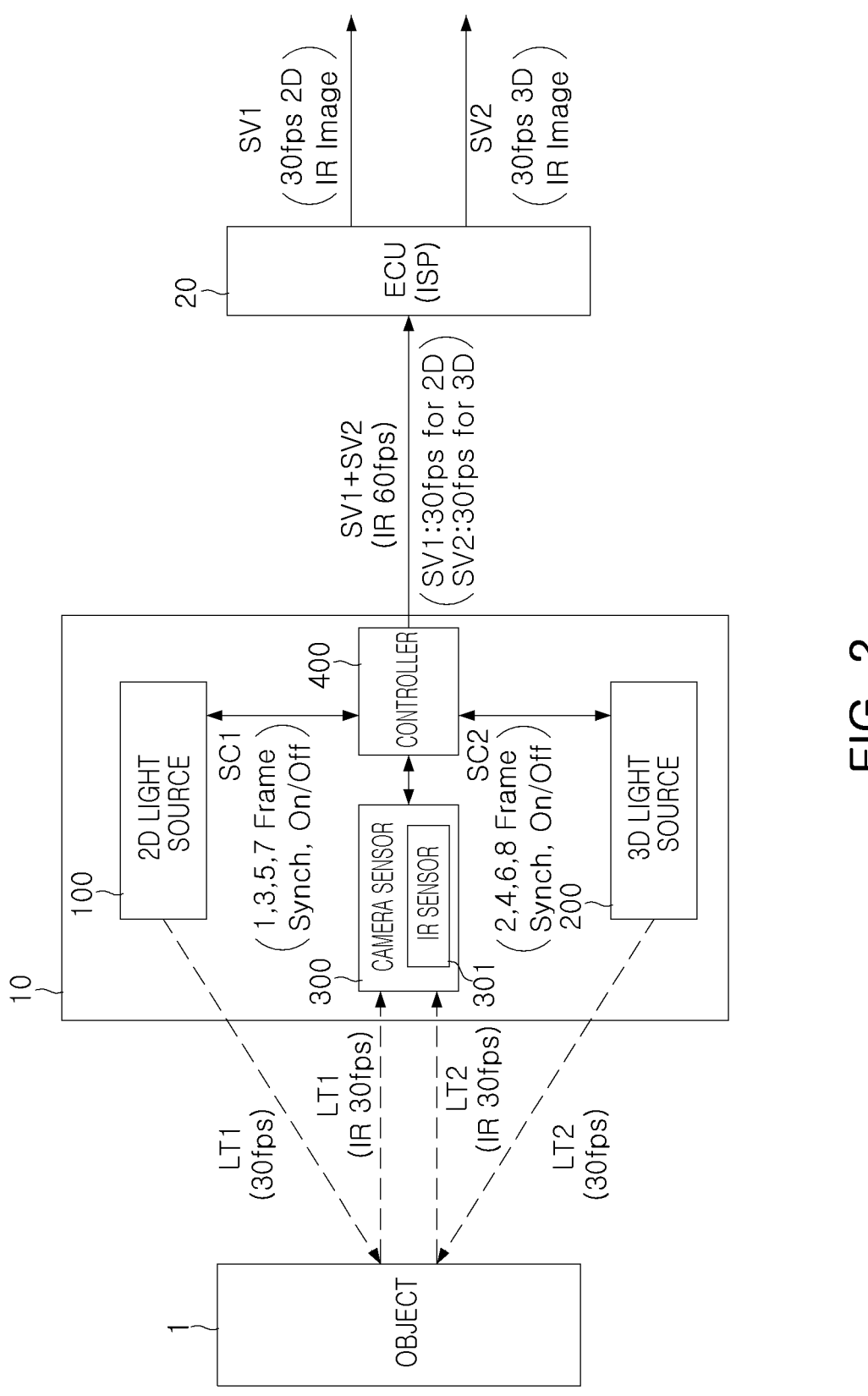
FIG. 2 is a schematic diagram of a camera apparatus according to an example.

FIG. 2 is a schematic diagram of a camera apparatus according to an example.

In a camera apparatus 10 shown in FIG. 2, the camera sensor 300 may include an IR sensor 301.

The camera sensor 300 may perform a time division mode which is time-divided into a first time T10 and a second time T20, at the first time T10, shoot the object 1 on which the first light LT1 is irradiated to generate the first image signal SV1, and at the second time T20, shoot the object 1 on which the second light LT2 is irradiated to obtain the second image signal SV2.

For example, during a time division mode operation, the first light LT1 generated by the 2D light source 100 may be IR irradiated to correspond to 30 fps, and the second light LT2 generated by the 3D light source 200 may be a structured light IR irradiated to correspond to 30 fps.

Figure 3:
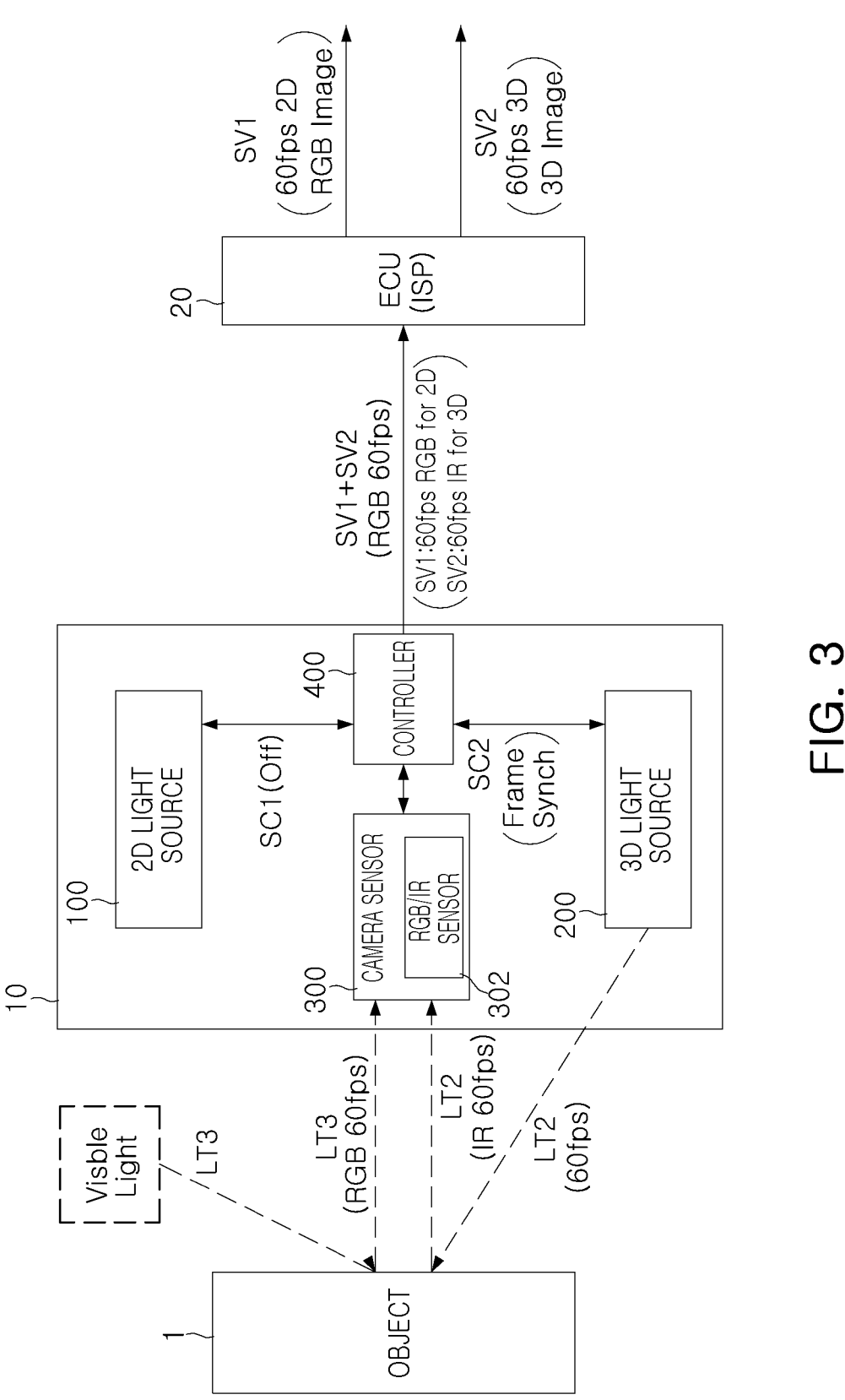
FIG. 3 is a schematic diagram of a camera apparatus according to an example.

FIG. 3 is a schematic diagram of a camera apparatus according to an example.

In a camera apparatus 10 shown in FIG. 3, the camera sensor 300 may include an RGB/IR sensor 302.

The camera sensor 300 may perform a frequency division mode, shoot the object 1 on which a visible light LT3 is irradiated to generate the first image signal SV1, and shoot the object 1 on which the second light LT2 is irradiated to generate the second image signal SV2.

For example, during a frequency division mode operation, the 2D light source 100 is in an off state, a 2D image (e.g., 60 fps) of the object 1 on which the visible light is irradiated is incident on the camera sensor 300, and the second light LT2 generated by the 3D light source 200 may be a structured light IR irradiated to correspond to 60 fps.

Figure 4:
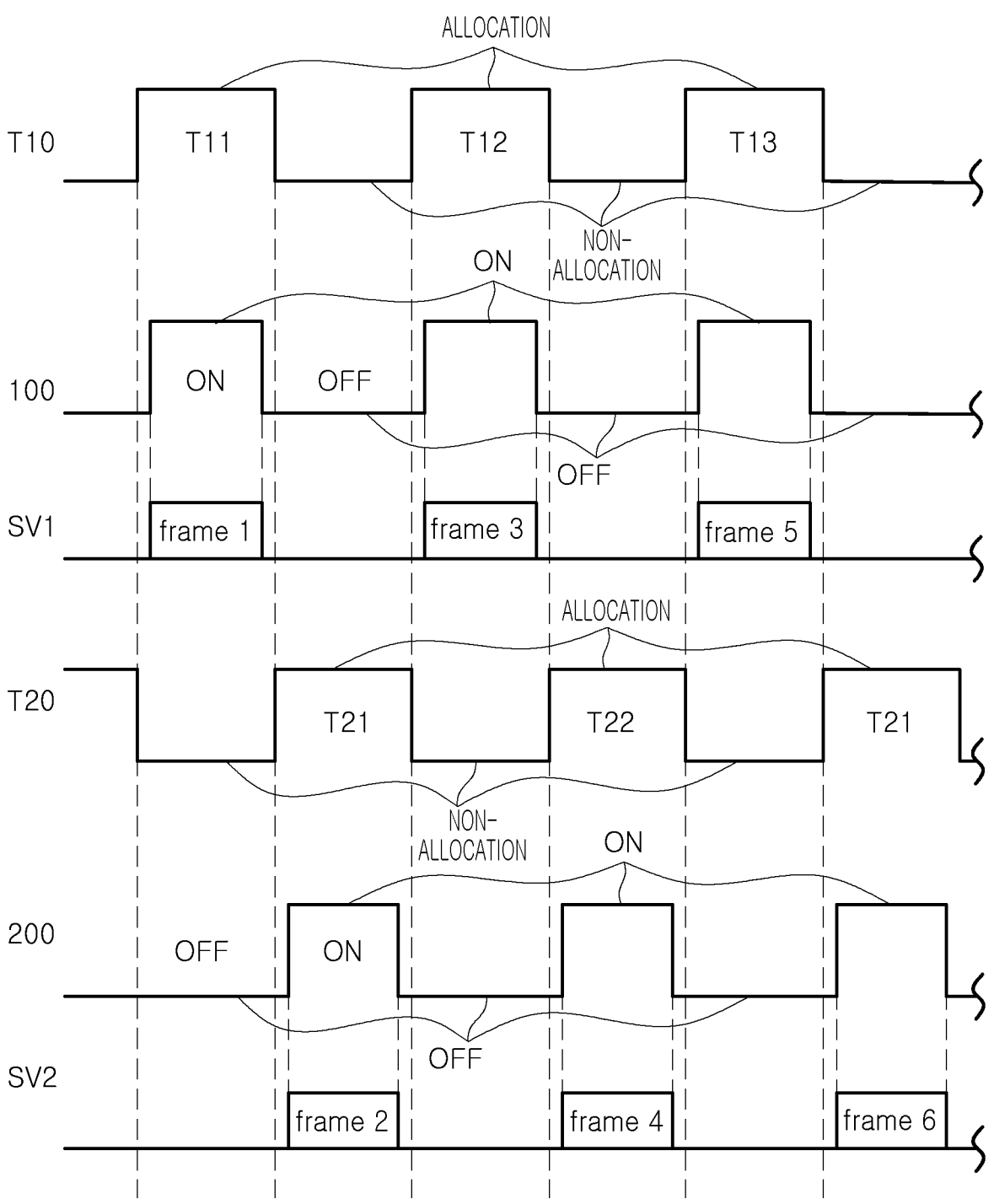
FIG. 4 is a schematic diagram of a time division mode of a camera apparatus.

FIG. 4 is a schematic diagram of a time division mode of a camera apparatus.

Referring to FIGS. 1, 2, and 4, the first time T10 and the second time T20 in the time division mode may include times alternately allocated to each other.

For example, the first time T10 may include allocated times T11, T12, and T13, and the second time T20 may include allocated times T21, T22, and T23 so as not to overlap the first time T10.

The controller 400 may control the 2D light source 100 to operate at the first time T10 and generate the first light LT1, and the controller 400 may control the 3D light source 200 to operate at the second time T20 and generate the second light LT2.

The 2D light source 100 may be enabled at the times T11, T12, and T13 included in the first time T10 under the control of the controller 400 to generate the first light LT1. The 3D light source 200 may be enabled at the times T21, T22, and T23 included in the second time T20 under the control of the controller 400 to generate the second light LT2.

The first image signal SV1 may include a plurality of frames frame 1, frame 3, and frame 5 generated at the times T11, T12, and T13 included in the first time T10, and the second image signal SV2 may include a plurality of frames frame 2, frame 4, and frame 6 generated at the times T21, T22, and T23 included in the second time T20.

Figure 5:
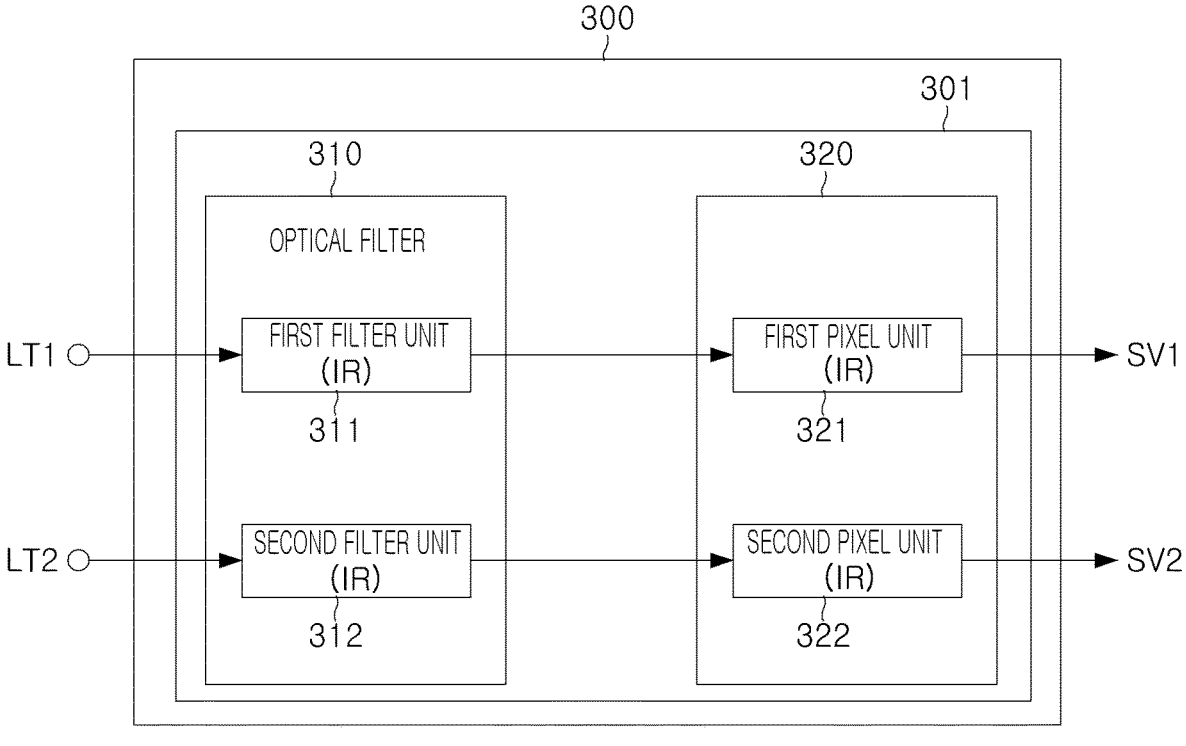
FIG. 5 is a schematic diagram of a camera sensor.

FIG. 5 is a schematic diagram of a camera sensor.

Referring to FIG. 5, for example, the camera sensor 300 may include the IR sensor 301 for a time division mode operation.

The IR sensor 301 may include an optical filter 310 and an image sensor 320.

The optical filter 310 may allow the first light LT1 and the second light LT2 to pass therethrough and block light except for the first light LT1 and the second light LT2.

The image sensor 320 may sense the first light LT1 and the second light LT2 incident through the optical filter 310 to generate the first image signal SV1 and the second image signal SV2.

For example, the optical filter 310 may include a first filter unit 311 and a second filter unit 312. The first filter unit 311 may allow the first light LT1 to pass therethrough. The second filter unit 312 may allow the second light LT2 to pass therethrough.

For example, the second filter unit 312 may allow the second light LT2 that is infrared ray (IR) of 940 nm to pass therethrough, and the first filter unit 311 may allow a visible light having a wavelength shorter than a wavelength of the second light LT2. Alternatively, the first filter unit 311 may allow a signal of light having a frequency higher than that of a signal of the second light LT2.

For example, the image sensor 320 may include a first pixel unit 321 and a second pixel unit 322. The first pixel unit 321 may sense the first light LT1 incident through the first filter unit 311 of the optical filter 310. The second pixel unit 322 may sense the second light LT2 incident through the second filter unit 312 of the optical filter 310.

Figure 6:
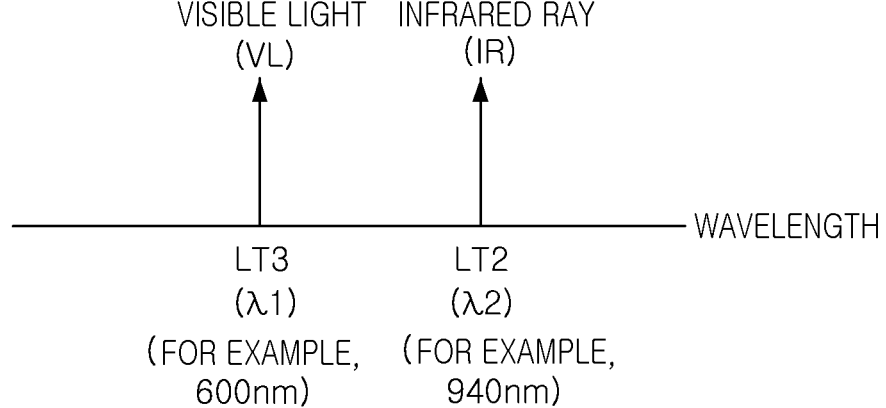
FIG. 6 is a schematic diagram of a frequency division mode (or a wavelength division mode) of a camera apparatus.

FIG. 6 is a schematic diagram of a frequency division mode (or a wavelength division mode) of a camera apparatus.

Referring to FIGS. 3 and 6, the controller 400 may disable the 2D light source 100 and enable the 3D light source 200 during a frequency division mode operation.

In this case, an image by each of the visible light LT3 ($\lambda$1) (e.g., 600 nm) and IR ($\lambda$2) (e.g., 940 nm) having different wavelengths may be incident on the camera sensor 300. In general, the wavelength range of visible light is 400 to 700 nm, and for example, the visible light wavelength used in the present example may be approximately 600 nm, but is not limited thereto.

As such, when light having different wavelengths is used, the camera sensor 300 may separate and process an incident image by using an optical filter.

Figure 7:
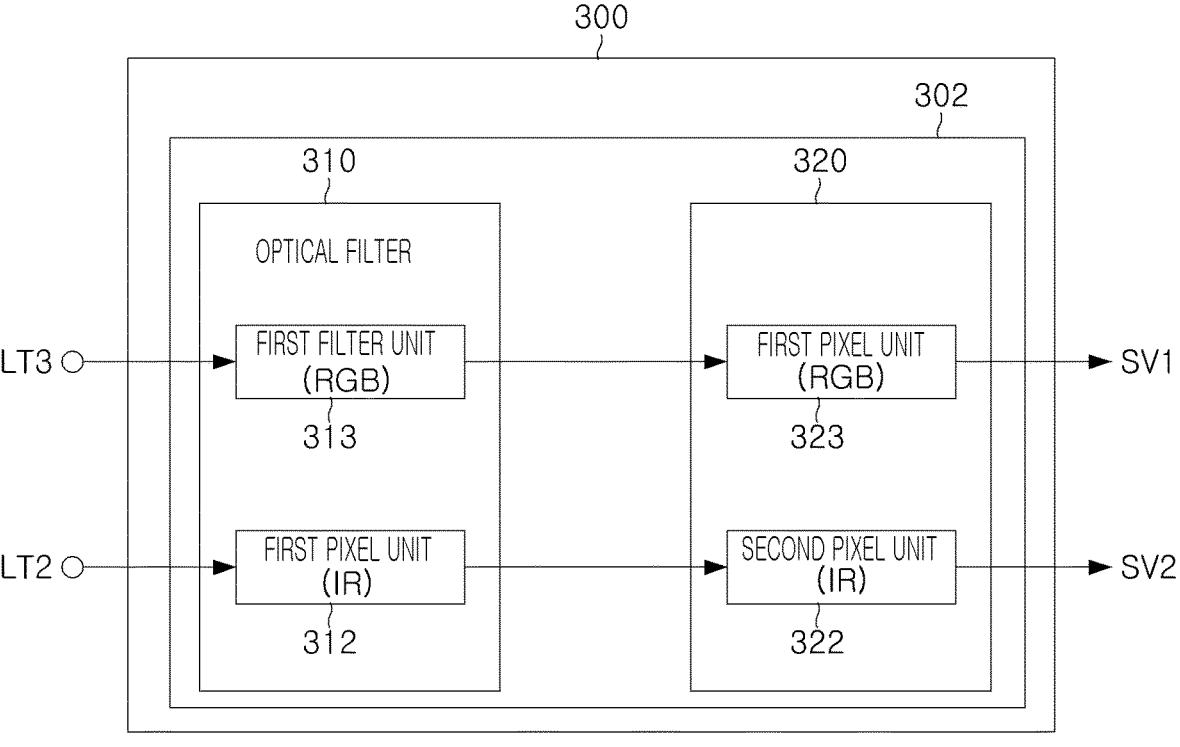
FIG. 7 is a schematic diagram of the camera sensor of FIG. 5.

FIG. 7 is a schematic diagram of a camera sensor of FIG. 5.

Referring to FIGS. 3, 5 and 7, the controller 400 may control the 2D light source 100 to be disabled during a frequency division mode operation, and the controller 400 may control the 3D light source 200 to be always enabled to generate the second light LT2 during a frequency division mode operation.

For example, the camera sensor 300 may include the RGB/IR sensor 302 for the frequency division mode operation.

The RGB/IR sensor 302 may shoot the object 1 on which the visible light LT3 is irradiated to generate the first image signal SV1 during the frequency division mode operation, and shoot the object 1 on which the second light LT2 is irradiated to generate the second image signal SV2.

The RGB/IR sensor 302 may include an optical filter 310 and an image sensor 320. The optical filter 310 may allow the third light LT3 and the second light LT2 to pass therethrough. The image sensor 320 may sense the visible light LT3 and the second light LT2 incident through the optical filter 310 to generate the first image signal SV1 and the second image signal SV2.

For example, the optical filter 310 may include a first filter unit 311 and a second filter unit 312. The first filter unit 311, as an RGB filter, may allow the visible light LT3 to pass therethrough and block light other than the visible light LT3. The second filter unit 312, as an IR filter, may allow the second light LT2 to pass therethrough and block light other than the second light LT2.

For example, the image sensor 320 may include a first pixel unit 321 and a second pixel unit 322. The first pixel unit 321 may sense the third light LT3 that is visible light incident through the first filter unit 311 of the optical filter 310. The second pixel unit 322 may sense the second light LT2 incident through the second filter unit 312 of the optical filter 310.

<Time Division Mode Operation Process>

Referring to FIGS. 1, 2, 4, 5 and 7, as an example, the IR sensor 301 (FIG. 2) or the RGB/IR sensor 302 (FIG. 3) may be used as the camera sensor 300.

As an example, the IR sensor 301 (FIG. 2) includes only IR pixels. Time division imaging may be used by using IR pixels as the IR sensor 301 (FIG. 2) in a dark environment, and using first light source (a general IR ray) and second light source (a structured light IR ray).

Alternatively, the RGB/IR sensor 302 (FIG. 7) includes RGB pixels and IR pixels. An RGB image may not be obtained by the RGB/IR sensor 302 (FIG. 7) because it is dark, when only IR pixels are used, time division imaging may be used. As an example, the RGB/IR sensor 302 (FIG. 7) may be a sensor having R G B IR pixels in a 1:1:1:1 ratio, and the IR sensor may be a sensor having only IR pixels.

A process of operating the camera apparatus of the various examples in the time division mode is summarized below with reference to FIG. 2 based on the above description.

(1) The first light source 100 (e.g., IR LED or VCSEL) irradiates the first light LT1 (IR ray) at 30 fps in accordance with a sensor exposure time of odd number (1, 3, 5, . . . ) frames.

(2) The IR ray LT1 of 30 fps reflected by the object 1 may sensitize IR pixels of the camera sensor 300 to obtain the first image signal SV1 that is an IR image signal of 30 fps.

(3) The second light source 200 (e.g., structured light IR VCSEL) irradiates the second light LT2 (IR ray) at 30 fps in accordance with a sensor exposure time of even number (2, 4, 6, 8) frames.

(4) The second light LT2, which is the structured light IR ray of 30 fps reflected from the object 1, may sensitize IR pixels of the camera sensor 300 to obtain the second image signal SV2 that is a structured light IR image signal of 30 fps.

(5) The first image signal by the first light (general IR ray) obtained through IR pixels of the camera sensor 300 includes the image of odd frames and is transmitted from the camera sensor 300 to an ECU 20 (see FIG. 1). Also, the second image signal by the second light (structured light IR ray) obtained through IR pixels of the camera sensor 300 includes the images of even frames and is transmitted from the camera sensor 300 to the ECU 20. Thus, when the first image signal and the second image signal are combined, an image signal of 60 fps is transmitted from the camera apparatus 10 to the ECU 20.

(6) The ECU 20 may separate a first image of odd number 30 fps and a structured light IR image of even number 30 fps.

(7) The first image by the first light of odd number 30 fps (general IR ray) may be used as a 2D image as needed.

(8) The second image by the second light of even number 30 fps (structured light IR ray) may calculate a 3D depth using an algorithm and may be used as a 3D image including depth information as needed.

<Frequency Division Mode Operation Process>

Referring to FIGS. 3, 5 and 7, for example, when an RGB image is obtained because the RGB/IR sensor 302 (FIG. 3) as the camera sensor 300 is sufficiently bright, frequency division imaging may be used. As an example, the RGB/IR sensor 302 (FIG. 3) may minimize mutual interference between visible light and IR by using a dual pass filter that allows only an IR region (e.g., 940 nm wavelength 1) and a visible light region less than or equal to 700 nm (e.g., 600 nm wavelength 2) to pass therethrough.

A process of operating the camera apparatus of the various examples in the frequency division mode is summarized below with reference to FIG. 3 based on the above description.

(1) In a state in which the first light source 100 is off, visible light, which is natural light, illuminates the object 1, and the reflected visible light LT3 is sensitized at 60 fps by RGB pixels of the RGB/IR sensor 302 so that the first image signal SV1 that is an RGB image of 60 fps may be obtained.

(2) The IR ray LT2 irradiated by the second light source 200 (e.g., structured light IR VCSEL) in accordance with the sensor exposure time of 60 fps frame may be reflected from the object 1 and sensitized by IR pixels of the RGB/IR sensor 302 so that the second image signal SV2 that is a structured light IR image of 60 fps may be obtained.

(3) A 2D image that is a general image may be obtained from RGB pixels of the RGB/IR sensor 302 (3 pixels among a total of 4 pixels), a 3D image that is a structured light IR image may be obtained from IR pixels of the RGB/IR sensor 302 (1 pixel among a total of 4 pixels), the 2D and 3D images are combined, and a merged image (RGB image+IR image) of 60 fps may be output to the ECU 20.

(4) The first image that is a general image of 60 fps obtained through RGB pixels of the RGB/IR sensor 302 may be transmitted to the ECU 20 and used as a 2D image as needed.

(5) The second image that is a structured light IR image of 60 fps obtained through IR pixels of the RGB/IR sensor 302 may be transmitted to the ECU 20 and used as a 3D image including depth information as needed by calculating a 3D depth by using an algorithm.

As described above, the camera apparatus according to the various examples described herein may shoot both a 2D image and a 3D image by using one camera not only in a dark environment but also in a bright environment.

The controller (for example, controller 400) of the camera apparatus according to the various examples may be implemented as a computing environment in which a processor (e.g., a central processing unit (CPU), a graphic processing unit (GPU), a microprocessor, an application specific integrated circuit (ASIC), field programmable Gate Arrays (FPGA), etc.), memory (e.g. volatile memory (e.g. RAM, etc.), non-volatile memory (e.g. ROM, flash memory, etc.), an input device (e.g. keyboard, mouse, pen, voice input device, touch input device, infrared camera, video input device, etc.), an output device (e.g., display, speaker, printer, etc.) and a communication connection device (e.g., modem, network interface card (NIC), integrated network interface, radio frequency transmitter/receiver, infrared port, USB connector, etc.) are interconnected to each other (e.g., peripheral component interconnect (PCI), USB, firmware (IEEE 1394), optical bus structure, network, etc.)

The computing environment may be implemented as a distributed computing environment including a personal computer, a server computer, a handheld or laptop device, a mobile device (mobile phone, PDA, media player, etc.), a multiprocessor system, consumer electronics, a minicomputer, a mainframe computer, any of the foregoing system or device, but is not limited thereto.

As set forth above, according to various examples, the camera apparatus with an integrated heterogenous video may shoot both 2D and 3D images by using one camera not only in a bright environment but also even in a dark environment.

As set forth above, according to various examples, in order to obtain 2D and 3D images, one camera is used instead of two cameras, and thus a camera installation space may decrease and the camera cost may be reduced.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera apparatus with an integrated heterogenous video comprising:
a two-dimensional (2D) light source configured to generate first light for 2D imaging and to irradiate the first light to an object;
a three-dimensional (3D) light source configured to generate second light for 3D imaging and to irradiate the second light to the object;
a camera sensor configured to perform a time division mode operation which is time-divided into a first time and a second time, to image the object on which the first light is irradiated to generate a first image signal at the first time, and to image the object on which the second light is irradiated to generate a second image signal at the second time; and
a controller configured to control synchronization of the 2D light source and the camera sensor and to control synchronization of the 3D light source and the camera sensor during the time division mode operation.

2. The camera apparatus of claim 1, wherein the controller is configured to control the 2D light source to operate at the first time to generate the first light.

3. The camera apparatus of claim 1, wherein the controller is configured to control the 3D light source to operate at the second time to generate the second light.

4. The camera apparatus of claim 1, wherein the camera sensor comprises:
an optical filter configured to allow the first light or a third light, which is a visible light, and the second light to pass therethrough; and
an image sensor configured to sense the first light or the third light and the second light incident through the optical filter and to generate the first image signal and the second image signal.

5. The camera apparatus of claim 4, wherein the optical filter comprises:
a first filter unit configured to allow the first light or the third light to pass therethrough; and
a second filter unit configured to allow the second light to pass therethrough.

6. The camera apparatus of claim 5,
wherein the camera sensor comprises an infrared ray (IR) sensor for the time division mode operation, and
wherein the image sensor comprises:
a first pixel unit configured to sense the first light incident through the first filter unit of the optical filter; and
a second pixel unit configured to sense the second light incident through the second filter unit of the optical filter.

7. The camera apparatus of claim 5, wherein the controller is configured to disable the 2D light source and to enable the 3D light source in a frequency division mode operation.

8. The camera apparatus of claim 7,
wherein the camera sensor comprises an RGB/IR sensor for the frequency division mode operation, and
wherein the image sensor comprises:
a first pixel unit configured to sense the third light incident through the first filter unit of the optical filter; and
a second pixel unit configured to sense the second light incident through the second filter unit of the optical filter.

9. A camera apparatus comprising:
a two-dimensional (2D) light source configured to generate first light for 2D imaging and to irradiate the first light to an object;
a three-dimensional (3D) light source configured to generate second light for 3D imaging and to irradiate the second light to the object;
a camera sensor configured to selectively perform one of a time division mode operation, in which the first light is irradiated on the object to generate a first image signal at a first time and the second light is irradiated on the object to generate a second image signal at a second time, and a frequency division mode operation, in which visible light is irradiated on the object to generate the first image signal and the second light is irradiated on the object to generate the second image signal; and a controller configured to selectively enable and disable the 2D light source and the 3D light source based on whether the camera sensor performs the time division mode operation or the frequency division mode operation.

10. A camera apparatus with an integrated heterogenous video comprising:

a 3D light source configured to generate second light different from a visible light for 3D imaging and to irradiate an object with the second light;

a camera sensor configured to perform a frequency division mode operation, to image the object on which the visible light is irradiated to generate a first image signal, and to image the object on which the second light is irradiated to generate a second image signal; and a controller configured to control the camera sensor to generate the first image signal and the second image signal during the frequency division mode operation.

11. The camera apparatus of claim 10, further comprising:

a 2D light source configured to generate first light for 2D imaging and to irradiate the first light to the object, wherein the controller is configured to disable the 2D light source during the frequency division mode operation.

12. The camera apparatus of claim 10, wherein the controller is configured to enable the 3D light source and to generate the second light during the frequency division mode operation.

13. The camera apparatus of claim 10, wherein the camera sensor comprises:

an optical filter configured to allow visible light and the second light to pass therethrough; and an image sensor configured to sense the visible light and the second light incident through the optical filter and to generate the first image signal and the second image signal.

14. The camera apparatus of claim 13, wherein the optical filter comprises:

a first filter unit configured to allow the visible light to pass therethrough; and a second filter unit configured to allow the second light to pass therethrough.

15. The camera apparatus of claim 14, wherein the camera sensor comprises an RGB/IR sensor for the frequency division mode operation, and wherein the RGB/IR sensor is configured to shoot the object on which the visible light is irradiated to generate a first image signal, and to shoot the object on which the second light is irradiated to generate a second image signal in the frequency division mode operation.

16. The camera apparatus of claim 14, wherein the camera sensor comprises an RGB/IR sensor for the frequency division mode operation, and wherein the image sensor comprises:

a first pixel unit configured to sense the visible light incident through the first filter unit of the optical filter; and a second pixel unit configured to sense the second light incident through the second filter unit of the optical filter.

17. The camera apparatus of claim 14, wherein the second filter unit is configured to allow the second light which is IR of 940 nm to pass therethrough, and wherein the first filter unit is configured to allow the visible light having a wavelength shorter than a wavelength of the second light to pass therethrough.

* * * * *